US008154246B1

(12) United States Patent　　　　　　　　　　(10) Patent No.: US 8,154,246 B1
Heitmann　　　　　　　　　　　　　　　　　　　(45) Date of Patent: Apr. 10, 2012

(54) METHOD AND SYSTEM FOR CHARGING OF ELECTRIC VEHICLES ACCORDING TO USER DEFINED PRICES AND PRICE OFF-SETS

(75) Inventor: Paul Heitmann, Madison, NJ (US)

(73) Assignee: Comverge, Inc., Norcross, GA (US)

( * ) Notice: Subject to any disclaimer, the term of this patent is extended or adjusted under 35 U.S.C. 154(b) by 582 days.

(21) Appl. No.: 12/363,242

(22) Filed: Jan. 30, 2009

(51) Int. Cl.
　　*H02J 7/00* (2006.01)
　　*H02J 7/04* (2006.01)
　　*G06F 17/00* (2006.01)
(52) U.S. Cl. .................. 320/109; 320/155; 705/400
(58) Field of Classification Search ............. 320/109, 320/155, 137; 705/400; 180/65.1, 65.21; 237/5
See application file for complete search history.

(56) References Cited

U.S. PATENT DOCUMENTS

| | | | |
|---|---|---|---|
| 5,462,439 A | 10/1995 | Keith | |
| 5,467,006 A | 11/1995 | Sims | |
| 5,548,200 A | 8/1996 | Nor et al. | |
| 5,565,755 A | 10/1996 | Keith | |
| 5,572,109 A | 11/1996 | Keith | |
| 5,594,318 A | 1/1997 | Nor et al. | |
| 5,598,084 A | 1/1997 | Keith | |
| 5,696,367 A | 12/1997 | Keith | |
| 7,256,516 B2 | 8/2007 | Buchanan et al. | |
| 7,679,336 B2 * | 3/2010 | Gale et al. | 320/155 |
| 7,782,021 B2 * | 8/2010 | Kelty et al. | 320/155 |
| 2008/0039989 A1 * | 2/2008 | Pollack et al. | 701/22 |
| 2010/0023376 A1 * | 1/2010 | Brown | 705/10 |

* cited by examiner

*Primary Examiner* — Igor Borissov
(74) *Attorney, Agent, or Firm* — Smith Risley; Steven P. Wigmore

(57) ABSTRACT

A method and system provides for the charging of electric vehicles according to user defined parameters. The method and system can include an enhanced thermostat, personal computer, and/or an electric vehicle charger which can receive various user defined vehicle charging parameters such as an initial price set point at which to start the charging of an electric vehicle. Another charging parameter can include one or more price offsets relative to the initial set point that can be provided by a user or generated by a computer program. The price offsets allow charging of an electric vehicle at prices above the desired initial price set point when the time remaining to charge an electric vehicle has diminished and the desired initial price set point has not been reached by the energy market. The price offsets can be assigned according to predetermined increments of time, such as an on an hourly basis.

20 Claims, 8 Drawing Sheets

200

Welcome to your Vehicle Charge Manager — 201

202 — Please enter the shortest distance you will travel for your next trip
_____ miles 204 — Please enter the longest distance you will travel for your next trip
_____ miles 206 — Please enter initial price set point you wish to pay to purchase the energy
_____ dollars/KWH 208 — Please enter desired offsets relative to initial price set point:
+ _____ cents/KWH 210 — Do you wish to upload any of your vehicle's energy for sale to the grid?

212 — If yes, please enter lowest price at which you will sell your vehicle's energy _____ dollars/KWH 214 — Please enter the time, date you will need your charged vehicle.

| hh:mm | mm/dd/year |

| Time Segment | Price Trigger | Price Level | Remaining Charge Window | Offset to Price Trigger* | Action Taken |
|---|---|---|---|---|---|
| 10-11PM | 10 c | 12 c | 7 hr | – | Inhibit charge |
| 11-12PM | 10 c | 12 c | 6 hr | – | Inhibit charge |
| 12-1AM | 10 c | 12 c | 5 hr | – | Inhibit charge |
| 1-2AM | 10 c | 12 c | 4 hr | +1 c — 208A | Inhibit charge |
| 2-3AM | 10 c | 12 c | 3 hr | +2 c — 208B | Enable charge |
| 3-4AM | 10 c | 14 c | 2 hr | +3 c — 208C | Inhibit charge |
| 4-5AM | 10 c | 14 c | 1 hr | +4 c — 208D | Enable charge |
| 5-6AM | 10 c | 15 c | 0 hr | +5 c — 208E | Enable charge |

*FIG. 3*

| Time Segment — 305 | Price Trigger — 206 | Price Level — 315 | Remaining Charge Window — 320 | Charge Rate Offset — 323 | Offset to Price Trigger* — 208 | Action Taken — 327 |
|---|---|---|---|---|---|---|
| 10-11PM | 10 c | 12 c | 7 hr | – | – | Inhibit charge |
| 11-12PM | 10 c | 12 c | 6 hr | – | – | Inhibit charge |
| 12-1AM | 10 c | 12 c | 5 hr | – | – | Inhibit charge |
| 1-2AM | 10 c | 12 c | 4 hr | +1 kWh — 323A | +1 c -- 208A | Inhibit charge |
| 2-3AM | 10 c | 12 c | 3 hr | +2 kWh — 323B | +2 c -- 208B | Enable charge |
| 3-4AM | 10 c | 14 c | 2 hr | +4 kWh — 323C | – | Inhibit charge |
| 4-5AM | 10 c | 14 c | 1 hr | +6 kWh — 323D | – | Inhibit charge |
| 5-6AM | 10 c | 15 c | 0 hr | +8 kWh — 323E | +5 c -- 208C | Enable charge |

*FIG. 4*

METHOD AND SYSTEM FOR CHARGING OF ELECTRIC VEHICLES ACCORDING TO USER DEFINED PRICES AND PRICE OFF-SETS

TECHNICAL FIELD

The invention is generally directed to electric vehicles, and relates more particularly to the charging of electric vehicles, such as plug-in hybrid electric vehicles (PHEVs).

BACKGROUND OF THE INVENTION

With the demand for alternative fueled, environmentally friendly or "green" vehicles on the rise, electric vehicles will become the vehicles of choice because of their zero emissions and their efficiency. Each electric vehicle may require a large amount of power to recharge. Many electric vehicle prototypes as of this writing have a storage capacity of 35 kWh. Each electric vehicle may require a recharge within a limited period of time, most likely overnight.

With more and more electric vehicles coming on line, electric rates will likely start to align with this increased demand. This means that as more electric vehicles are driven and coupled to the electrical grid, there will be certain times during the day in which electricity may be sold at a premium. For example, if the majority of a population of electric vehicle owners works between the hours of 9 AM to 5 PM, then it is likely that electrical demand for charging electric vehicles will peak between the hours of 6 PM to 8 PM when the electric vehicles reach their non-work destinations and are coupled to the grid to initiate charging of each electric vehicle for the next day's commute.

In view of this peak for electrical energy in the early evening hours, as demand for electrical power generally tapers off later in the evening and usually during the early hours of the morning prior to sunrise, the electrical rates will likely fall with this decrease in demand for power. This means that if an electric vehicle owner would like to charge his electric vehicle at the lower energy rates, then he would need to wait until this early morning time frame in which to couple his electric vehicle to the grid and start the charging of the electric vehicle.

One obvious problem with the electric vehicle operator waiting until the very early hours in the morning to charge his vehicle is that the electric vehicle operator will likely be sleeping during this window. Another problem with waiting for these early morning hours is that the electric vehicle operator could forget to couple his vehicle during or after this extended waiting period. A further problem is that there is no guarantee that demand for electric power will fall during these early morning hours.

There could be some situations in which demand for electrical power during the late evening and early morning hours does not taper significantly, such as in a cooling season for a particular geography which has many air conditioners coupled to the electrical grid. A further complication exists when the electrical energy rates drop during a time window in which there is not enough time during the window to reach a desired state of charge for the electric vehicle.

Accordingly, there is a need in the art for a system and method that can monitor electrical energy rates when an electric vehicle is coupled to the grid and to initiate charging of an electric vehicle when electrical lower electrical rates are available for the electric vehicle operator. There is also a need in the art for a method and system that can determine if charging of an electric vehicle should occur even if electrical rates have not dropped to values which are desired by an electric vehicle operator. A further need exists in the art for an intelligent method and system that can constantly determine if sufficient time remains to charge an electric vehicle while monitoring the electrical rates to determine the optimum time to start the charging of an electric vehicle.

SUMMARY OF THE INVENTION

A method and system can provide for the charging of electric vehicles according to user defined parameters. The method and system can include an enhanced thermostat, personal computer, and/or an electric vehicle charger which can receive various user defined vehicle charging parameters such as an initial price set point at which to start the charging of an electric vehicle. Another charging parameter can include one or more price offsets relative to the initial set point that can be provided by a user or generated by a computer program. The price offsets allow charging of an electric vehicle at prices above the desired initial price set point when the time remaining to charge an electric vehicle has diminished and the desired initial price set point has not been reached by the energy market. The price offsets can be assigned according to predetermined increments of time, such as an on an hourly basis.

The enhanced thermostat, personal computer, or electric vehicle charger may also receive other vehicle charging parameters such as ranges for the rate of charging the electric vehicle if a vehicle charger has the ability to download energy at different rates. Charge rates, like the price offsets, can be assigned according to predetermined increments of time, such as on an hourly basis.

The enhanced thermostat, personal computer, or vehicle charger may also have a charging program or charging logic to determine if the amount of energy that can be uploaded from an energy storage unit of an electric vehicle would be more valuable to the vehicle operator than attempting to download energy to charge the electric vehicle to the state desired by the vehicle operator. According to one exemplary embodiment, the charging program can access an electronic calendar of a vehicle operator and can schedule days that are more economical for the vehicle operator to upload energy to the grid instead of driving the vehicle and it can schedule days in which it is more economical for the vehicle to download energy from the grid compared to uploading energy to the grid.

BRIEF DESCRIPTION OF THE DRAWINGS

FIG. 2 illustrates a user interface for an electric vehicle charger illustrated in FIG. 1 that can be accessed by a home computer or enhanced thermostat according to one exemplary embodiment of the invention.

FIG. 3 is a table illustrating price offsets relative to a initial price set point that can be adjusted by a user or adjusted automatically by software according to one exemplary embodiment of the invention.

FIG. 4 is a table illustrating price offsets as well as charge rates that can be adjusted by a user or adjusted automatically by software according to one exemplary embodiment of the invention.

DETAILED DESCRIPTION OF EXEMPLARY EMBODIMENTS

Figure 1:
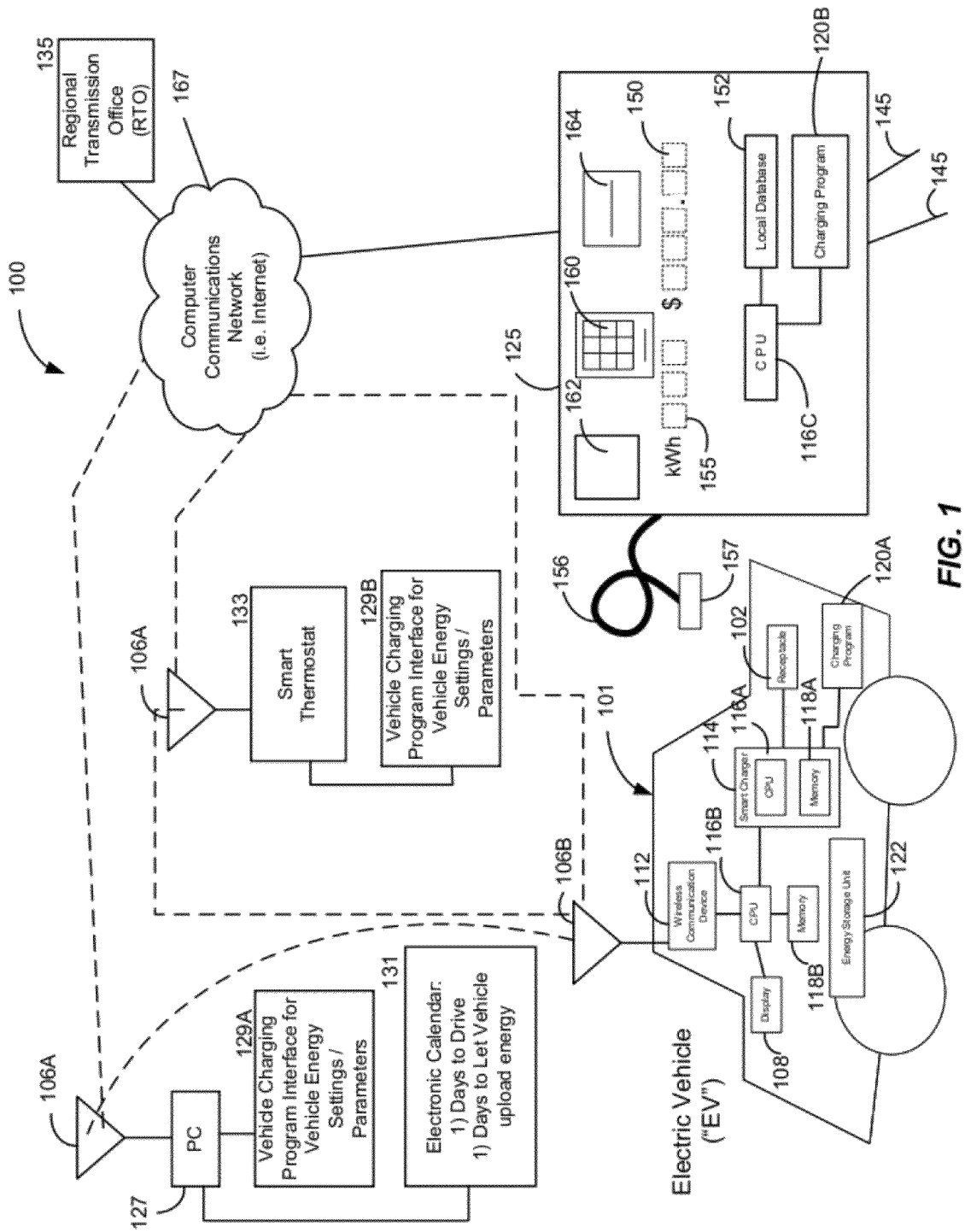
FIG. 1 is a functional block diagram illustrating a system for charging an electric vehicle according to one exemplary embodiment of the invention.

Turning now to the drawings, in which like reference they most refer to like elements, FIG. 1 is a functional block diagram illustrating a system 100 for charging an electric vehicle according to one exemplary embodiment of the invention. The system 100 can include a personal computer (PC) 127, a smart thermostat 133, and the computer communications network 167. The computer communications network 167 can comprise a wide area network ("WAN"), local area network ("LAN"), or the Intranet. The computer communications network 167 can also comprise an advanced metering infrastructure ("AMI") that is a system used to measure, collect, and analyze energy usage from enhanced devices such as electricity meters, gas meters, and/or water meters through various communication media on request or on a predefined schedule. This infrastructure typically includes hardware, software, communications, and customer associated systems in meter data management software. AMI typically permits two-way communications with a utility meter.

The personal computer 127 and smart thermostat 133 can be coupled to the computer communications network 167 through wireless links such as a radio-frequency link in which antennas 106A are used. One exemplary communication link can comprise the Zigbee communications protocol that will be described in further detail below. While a wireless embodiment is illustrated in FIG. 1, a wired, line-based embodiment is also within the scope of the invention. The personal computer 127 and smart thermostat 133 can run or execute a vehicle charging program interface 129 in order to manage vehicle energy setting/parameters for an electric vehicle 101. Further details of the vehicle charging program interface 129 will be described in further detail below with respect to FIGS. 2-4. The personal computer 127 can further run or execute a program module that includes electronic calendar 131 which will allow the use to track the days of a particular month in which a user may operate the electric vehicle 101.

Like the personal computer 127 and smart thermostat 133, the electric vehicle 101 can also comprise an antenna 106A so that the electric vehicle 101 can wirelessly communicate with the computer communications network 167 or directly with the personal computer 127 or smart thermostat 133. In other words, the personal computer 127 and smart thermostat 133 can communicate with the electric vehicle 101 through either the computer communications network 167 or directly with the electric vehicle 101 by a direct wireless link between the respective antennas 106A, 106B. The electric vehicle 101 can be coupled to a charging station 125.

The system 100 can be designed such that the personal computer 127, smart thermostat 133, and charging station 125 are part of a single dwelling such as a family household. The charging station 125 can be positioned within a garage or adjacent to a dwelling and the electric vehicle 101 can be positioned adjacent to the charging station 125 when the energy storage unit 122 of the electric vehicle 101 needs energy. The electric vehicle 101 can comprise a receptacle 102 that receives a plug 157 which has a power line 156 that is coupled to the charging station 125.

Electric vehicle 101 can comprise a wireless communication device 112 that supports radio-frequency communications. One of ordinary skill in the art recognizes that other forms of wireless communication are within the scope of the invention. For example, other wireless communication forms (not illustrated) include, but are not limited to, magnetic, optical, acoustic, and other like wireless media.

The wireless communication device 112 can comprise a radio-frequency transceiver such as a packet radio. In one preferred exemplary embodiment, the wireless media supported by the wireless communication device 112 can comprise radio frequencies that utilize a predetermined communication protocol. One exemplary protocol is the Zigbee wireless communication protocol. According to this wireless communication protocol standard, small, low-powered digital radios can employ the IEEE 802.15.4-2006 standard for wireless personal area networks (WPANs). However, other communication protocols and standards for radio frequency communications are not beyond the scope of the invention. For example, other communication protocols can include, but are not limited to, IEEE 802.11, Bluetooth, IEEE 802.16 (Wireless LAN (WAN)) and other like wireless communication protocols. The personal computer 127 and smart thermostat 133 can also comprise a wireless communication device 116 (not shown) similar to the wireless communication device 116 which is part of the electric vehicle 101.

According to an alternative exemplary embodiment (not illustrated), the wireless communication device 116 in the electric vehicle 101, personal computer 127, and smart thermostat 133 can be substituted with a power line communications module. The power line communications module can be part of a system for carrying data on conductors that may also be used for electric power transmission. The power line communications module may utilize an industry standard power line communications system such as HomePlug 1.0 which is a specification for home networking that couples devices to each other through power lines in a home.

The electric vehicle 101 can comprise any type of electric vehicle 101 which uses electrical power to propel the vehicle 101. However, other energy sources beyond electricity are within the scope of the invention. The energy storage unit 122 can comprise other forms of storage known to one of ordinary skill in the art. For example, energy storage unit 122 could comprise a power cell. However, according to one exemplary and preferred embodiment of the invention, the energy storage unit 122 can be designed to specifically store electrical power and may take the form of either a battery, a plurality of batteries, a plurality of capacitors, or any combination thereof.

The electric vehicle 101 can include pure electric and hybrid vehicles, such as plug-in hybrid electric vehicles (PHEVs), especially vehicles that have significant storage battery capacity and that connect to the power grid for recharging a battery. The electric vehicle 101 typically obtains some or all of its energy for motion and other purposes from the power grid. The electric vehicle 101 can be any one of classes of 3 types of electric vehicles: (a) neighborhood electric vehicles; (b) battery electric vehicles; and (c) the plug-in hybrid electric vehicles (PHEVs) discussed above. A neighborhood electric vehicle generally includes those that are simple and look very much like golf carts. Meanwhile, battery electric vehicles can include vehicles like cars that run entirely on battery power and do not have any fossil fuel burning equipment on board. And lastly, PHEVs may have onboard fossil fuel-based electric power generation such as a car engine or a fossil fuel generator.

The electric vehicle 101 may further comprise a central processing unit (CPU) 116A that may be couple to a display 108, memory 118B, and a smart charger 114. The smart charger 114 may also be part or may be physically housed in the electric vehicle 101.

The display 108 of the electric vehicle 101 can comprise any type of device which can display information to the operator or driver of the electric vehicle 101. According to one exemplary embodiment, the display 108 can comprise a LCD display. However, other displays are not beyond the scope of the invention. Further, it is possible that the CPU 116B of the electric vehicle 101 could send display information to a display of a wireless device that is operated by a driver of the electric vehicle 101. Such a device may include, but is not limited to, a personal digital assistant or a mobile phone which can include its own display 208.

The memory 118B coupled to the CPU 116B and memory 118A of the smart charger 114 of the electric vehicle 101 can comprise any type of machine-readable medium. Any machine-readable medium can include, but is not limited to, floppy diskettes, optical disks, CD-ROMs, magneto-optical disks, ROMs, RAMs, EPROMs, EEPROMs, magnetic or optical cards, flash memory, or any other type of media/ machine-readable medium suitable for storing electronic instructions for the CPUs 116A, 116B.

The CPU 116B of the electric vehicle 101 may also be coupled to a smart or intelligent charger 114. The smart or intelligent charger 114 may also comprise its own central processing unit 116A and its own memory 118A. However, one of ordinary skill in the art recognizes that the electric vehicle 101 may comprise a smart charger 114 that has its own CPU 116A but does not include a second or different CPU 116B for the entire electric vehicle 101. Various different embodiments in which the electric vehicle 101 only has the smart charger 214 as its central processing unit 116A without any processing units are not beyond the scope of the invention. A smart charger 114 may be coupled to the energy storage unit 122.

A charging program 120A may reside in the memory 118A of the smart charger 114. Charging program 120A can be executed by the CPU 116A of the smart charger 114. Further details of the charging program 120A that forms part of the inventive system 100 will be described in further detail below with respect to FIGS. 2-5.

The energy storage unit 122 may comprise one or more batteries, super capacitors, other energy storage devices or any combination of the aforementioned energy storage devices. The energy storage unit 122 can be intermittently or permanently connected to an electric power grid and can provide dynamic input and output of power. The energy storage unit 122 can function as a power source or a power load. However, it is envisioned that the system 100 can also service energy storage units 122 which are designed solely to be a power load (for charging a vehicle 101) and do not provide any energy back to the electric power grid.

According to an exemplary embodiment of the invention, a collection of aggregated energy storage units 122 of an electric vehicle 101 can become a stable resource when a plurality of energy storage units 122 are pulled together. A plurality of energy storage units 122 can provide a stable, a reliable resource to call upon by an electric grid or part of an electric grid when there may be a need for an increase or decrease in electrical power.

The smart charger 114 can store in its memory 118A various parameters which relate to a specific energy storage unit 122 of a particular electric vehicle 101. For example, such parameters can include the type of battery, as well as optimal charging loads and discharges as well as the current level of energy present in the energy storage unit 122. A smart charger 114 may also convey such parameters like the amount of energy levels desired by the owner or operator of the electric vehicle 200, as well as the amount of energy the owner operator of the electric vehicle 101 may be willing to shed or upload to the electric power grid through a vehicle-to-grid (VtoG) upload. The smart charger 114 can be coupled to a receptacle 102 that can receive the connector 157 of a particular electric vehicle infrastructure which is a charging station 125.

The connector 157 of the charging station 125 can link the receptacle 102 of the electric vehicle 101 to a transmission line 156. The transmission line 156 can support any type of electric power flow between the electric vehicle 101 and a particular charging station 125.

The charging station 125 can comprise a display 162, a keypad 160, and a receptacle 164 for receiving various types of tokens such as cards. The charging station 125 may further comprise an additional numerical display 155 and 150 for displaying energy received from or transferred to the electric vehicle 101.

For example, a first numerical display 155 can display the amount of energy transferred to or received from the electric vehicle 101 in power units such as in kilowatts per hour. The second numerical display 150 of the charging station 125 can display a currency amount that corresponds to the energy transfer depicted in the first numerical display 155. For example, the second numerical display 150 can provide a numerical value in currency such as in U.S. dollars and U.S. cents for the amount of energy that was transferred to or received from the electric vehicle 101.

The charging station 125 can be coupled to power lines 145 which may receive electrical energy or transmit electric energy to various locations. The power lines 145 can also provide direct communications with the computer communications network 167 such as through a power lines communications standard like the home-plug standard discussed above. The charging station may further comprise its own CPU 116C and a corresponding charging program 120B.

The charging program 120B of the charging station 125 can be the same as the charging program 120A discussed above with respect to the electric vehicle 101. However, it is envisioned that either one of the electric vehicle 101 or the charging station 125 would contain and run or execute the charging program 120. Therefore, if the charging program 120B was present in the charging station 125, then the charging program 120A of the electric vehicle 101 would not be present or utilized, and vice versa. However, one of ordinary skill in the art recognizes that the charging program 120 could be distributed across both platforms, that is, across the electric vehicle 101 and charging station 125 without departing from the scope of the invention. Similarly, the personal computer 127 and smart thermostat 133 could also support the charging program 120 and control the smart charger 114 through their respective wireless links. The charging program 120 can monitor a regional transmission operator (RTO) or industry standard operators (ISOs) market signals which may inform the charging program 120 the daily/hourly (time increment) rate of energy such as the present rate for electrical power which may be expressed in cents or dollars (currency) per kilowatt hour. One of ordinary skill in the art recognizes that other power rates expressed in non-American units are included within the scope of the invention. The computer program 120 may receive the RTO/ISO market signals from one or more different sources. The RTO/ISO markets signals can be sent directly by a respective RTO 135 from the power grid through power line communications (PLCs) or through the computer communications network 167.

The charging program 120 can continuously monitor the RTO/ISO market signals for the present rate of energy that can be downloaded to an energy storage unit 122 of the electric vehicle 101 or energy that can be taken from the energy storage unit 122 and transferred back up to the electric grid such as VTG uploads. Further details of the charging program 120 will be discussed below in connection with FIGS. 2-6.

Referring now to FIG. 2, this figure illustrates a user interface for an electric vehicle charger 114 that could be accessed by the home computer 127 or an enhanced thermostat 133 according to one exemplary embodiment of the invention. An exemplary display 200 may be provided on a display of the personal computer 127 or the smart thermostat 133. Alternatively, the display 200 may be provided on a display device 108 of the electric vehicle 101. The display 200 may provide a user interface 201 that is supported by the vehicle charging program interface 129 or by the charging program 120 itself.

With the user interface 201, the charging program 120 or the vehicle charging program interface 129 can receive data from a user of the electric vehicle 101 that may be relevant to how the electric charger 114 supplies energy to or takes energy from the energy storage unit 122 as illustrated in FIG. 1. Specifically, a user may enter shortest distance data 202 into the user interface 201. Similarly, a user may enter longest anticipated distance travel data 204 into the user interface 201. Based on this distance data 202, 204 the charging program 120 may calculate the amount the charge that will be needed to be placed in the energy storage unit 122 based on a conversion of this distance data 202, 204.

In addition to supplying distance data 202, 204, the user may also supply price point data 206 in dollars (currency) per kilowatt hour (kWh) in which the user wishes to purchase the energy to charge the energy storage unit 122. The price point data 206 can be one of the variables that are monitored by the charging program 120 during a charging process or charging cycle. The user may also enter desired offsets 208 relative to the initial set point 206 in the some form of currency per kilowatt hour such as in U.S. cents per hour. Further details about the price offsets 208 will be discussed in connection with FIGS. 3 and 4.

The user may also enter in upload energy data to 10 to indicate whether excess energy that may be available in the energy storage unit 122 such that the electric vehicle charger 114 will upload excess energy as appropriate to the power grid. The user may also indicate lowest price data 212 at which the user desires to sell any excess energy in the energy storage unit 122.

Further, the user may also enter time and date data 214 in which the user will need the electric vehicle 101 to be appropriately charged for the estimated distance data 202, 204 that was entered by the user into the user interface 1. The date data 288 can be entered according to a specific format 216 such as in hour and minute and month, date, year.

Referring now to FIG. 3, this figure is a table 300 illustrating price offsets 208 relative to an initial price set point 206 that can be adjusted by a user or adjusted automatically by the charging program 120 according to one exemplary embodiment of the invention. The first column of table 300 illustrates a window of time in one hour increments between the hours of 10:00 PM and 6:00 AM which will likely be the critical periods for charging electric vehicles 101 when a typical workday is believed to occur between the hours of 7:00 AM until 6:00 PM. However, other increments as well as a shorter or longer window of time could be expressed in table 300 without departing from the scope of the invention. In other words, half-hour segments or quarter-hour segments could be illustrated in the first column 305 of table 300. Additionally, the hours for an entire 24-hour day could be illustrated as well.

The second column 206 can illustrate the initial price set point that a user may select in which to purchase or download electrical energy for storing in the energy storage unit 122 of the electric vehicle 101. While only a single initial price set point of ten cents per kilowatt hour as illustrated in FIG. 3, it is envisioned that a user may be able to enter different price set points for each time increments listed in table 300. Further, the user interface 201 may provide a display in a table format such that table 300 is conveyed to a user so that a user can adjust the cells of the table 300. Also, it is recognized that other currencies and increments for tracking power can be used without departing from the scope of the invention. However, as of this writing, it is envisioned that the kilowatt hour will generally be the unit of measurement for electric energy consumed by a user for a particular electric vehicle 101.

The third column 315 indicates the price level for a given time segment 305 for a particular day. As noted previously, other time increments, besides hourly increments, are within the scope of the invention. For the example illustrated in FIG. 3, the price level 315 for the time window between 10:00 PM and 3:00 AM appears to be at twelve cents per kilowatt hour. Meanwhile, the price level 215 increased between the hours of 3:00 AM and 5:00 AM from twelve cents per kilowatt hour to fourteen cents per kilowatt hour. And lastly, in the time increment between 5:00 AM and 6:00 AM, the price level 215 increased to a value of fifteen cents per kilowatt hour for this particular example.

Referring now to the fourth column 320 of FIG. 3, this column 320 indicates the remaining time to charge the electric vehicle 101 based on the time data 214 supplied by the user and the user interface 201. In this particular, example the user plugged in the electric vehicle 101 at 10:00 PM and requested that the vehicle charger 114 charge the electric vehicle to a predetermined level by 6:00 AM the following morning.

Referring now to the fifth column 208 of FIG. 3, this column 208 provides a plurality of price offsets 208A-208E that can be set by a user or computed by the charging program 120A. For example, as discussed above, a user may enter a price offset 208 in the user interface 201 of FIG. 2. This price offset 208 entered into the user interface 201 may comprise a maximum price offset relative to the initial price set point 206 at which the user desires the electric vehicle 101 to be charged. A user may enter the maximum price offset 208 in the user interface 201 of FIG. 2. The charging program 120 may then calculate a range of lower offset prices 208A-208E based on the maximum value entered in the user interface 201 of FIG. 2. For example, if a user entered a maximum price offset 208 comprising five cents per kilowatt hour, then the charging program 120 could calculate smaller price offsets 208A-208D based on the number of time segments 305 provided in the time segment column 305. Using this distributed invariable spectrum of offset values based on the maximum price offset value 208, the charging program 120 can provide increased value for the electric vehicle user.

Alternatively, table 300 could be provided as part of the user interface 201 so that the electric vehicle user can enter individual price offsets 208A-208E. The spectrum of price offset values 208 that are provided automatically by the computer program 120 can have a rate of increase corresponding to the remaining charge window 320. That is, the charging program 120 can increase the price offset 208 based on the amount of time remaining to charge the electric vehicle 101 to a desire level. This means as the amount of time remaining to charge the electric vehicle 101 is reduced, then the corresponding price offset 208 can be increased up to the maximum price offset value 208 provided by the user. Alternatively, as noted above, the charging program 120 can automatically provide the prices offsets 208 relative to the initial price set point 206. Further, as noted above, more than one initial price set point 206 could be provided if a user was permitted to adjust or provide entries for the table 300.

Referring to the sixth column 330, this column indicates whether the smart charger 114 provided any charge to the energy storage unit 122 based upon an assessment between the initial price set point 206, the current price level 315, and the corresponding offset price value 208. In the exemplary embodiment illustrated in FIG. 3, because the initial price set point 206 of ten cents was for the hours between 10:00 AM and 2:00 AM and because the price offset values 208 when added to the initial set point price 206 were less than the current price level 315, the smart charger 114 did not initiate any charging of the energy storage unit 122. Similarly, because the initial price set point 206 between the hours of 3:00 AM and 4:00 AM is ten cents and the current price level at that time is fourteen cents, and because the price offset value 208 for that window is less than the current price level, the smart charger 114 did not initiate any charging of the energy storage unit 122. Meanwhile, the initial price set point 206 between the hours of 2:00 AM and 3:00 AM and 4:00 and 6:00 were less than the current price level 315 for those windows, when the price offset values 208 to the initial price set points 206, the resulting value was greater than the current price level 315 such that the smart charger 114 started charging the energy storage unit 122. One of ordinary skill in the art recognizes that the table 300 contains exemplary values and that each entry in the table can be adjusted without departing from the scope of the invention.

Referring now to FIG. 4, this figure is a table illustrating price offsets 208 as well as charge rates 323 that can be adjusted or varied by a user or adjusted automatically by software according to one exemplary embodiment of the invention. Table 400 has values which are similar to values that are contained in table 300 of FIG. 3. Therefore, only the difference between FIGS. 3 and 4 will be discussed below.

In addition to tracking price offsets 208, table 400 now includes a column dedicated to a charge rate offset 323. This charge rate offset 323 corresponds to an ability of a smart charger 114 to be able to vary or adjust its charge rate with respect to downloading energy from a charging unit 125 and feeding that energy into the energy storage unit 122. In other words, the smart charger 114 may have the ability to charge or replenish energy for the energy storage unit 122 at more than one rate. This means that the smart charger 114 may have the ability to triple charge the energy storage unit 122 or provide for rapid charging of the energy storage unit 122.

For example, the smart charger 114 may have a range for its charge rate such as between about 1 kilowatt-hour to about 200 kilowatt-hours. One of ordinary skill in the art recognizes that a charge rate can be dependent on several factors, such as, but not limited to, the physical and chemical properties of the battery and the hardware for the smart chargers 114.

As another example with respect to charge rates, as of this writing, there can be at least three different charge rate ranges which will be identified as follows: Level One; Level Two; and Level Three charge ranges. A Level One charge rate range may comprise a charge rate range of about 1.5 kilowatt hours to about 3.0 kilowatt hours. However, other rates beyond these end exemplary endpoints are possible and are within the scope of the invention. This Level 1 charge rate range can be supported by hardware and software which comprises an ordinary house hold "plug" that is inserted into a standard electrical socket having 120 Volts and twenty amps of powering capacity. If a smart charger 114 is only designed for Level One charging, then the smart charger 114 usually cannot exceed this Level One charge rate range. However, if the smart charger 114 supports a Level Two charge rate range, then the smart charger 114 can support a greater range of charge rates which include and exceed the Level One charge rate range.

A Level Two charge rate range can be based on the Society of Automotive Engineers (SAE) standard 1772 AC charging protocol as of this writing. SAE 1772 provides that the smart charger 114 comprises a special plug for the electric vehicle 101. The 1772 standard also provides that the smart charger 114 supports 110-240 Volts and 70 amps. With hardware and software which supports such powering requirements, the smart charger 114 with a Level Two charge rate range can comprise and encompass charge rate ranges between about 1 kilowatt-hour to about 80 kilowatt-hours. However, other rates beyond these end exemplary endpoints are possible and are within the scope of the invention.

A Level Three charge rate range can comprise one between about 1 kilowatt hour to about 200 kilowatt hours. However, other rates beyond these end exemplary endpoints are possible and are within the scope of the invention. This Level Three charge rate range, like the Level Two charge rate range, would require special hardware and software for the smart charger 114. For example, the Level Three charge rate range may require a special plug that is much different than an ordinary household "plug" for 120 Volt household applications. A Level Three charge rate range would also only work with special batteries that could accept such charge rate ranges. Exemplary batteries could include those rated for 35 kilowatt hour capacities. With these metrics for the smart charger 114 and batteries, an electric vehicle could be charged to a full level within time frames of the order of ten minutes or slightly greater.

Referring now to FIG. 4, similar to the initial price set point 206 and the price offsets 208 illustrated in FIG. 3, a user may be able to adjust the charge rate offset 323. Usually, the ability to adjust the charge rate offset 323 will be tied with the type of smart charger 114 being used and the energy storage unit 122 of the electric vehicle 101. As discussed above, smart chargers 114 that support the Level Two and Level Three charge rate ranges may be able to adjust their charge rate offset 323 as described in Table 400.

This table 400 can be provided in the user interface 201 of FIG. 2. Similar to FIG. 3 and as described above, in the alternative, the charging program 120 may also adjust the charge rate offset 323 automatically. For example, the charging program 120 can determine what is the optimum rate to charge the energy storage unit 122 given the current price level 315 and the remaining charge window 320.

Referring now to the exemplary values contained within table 400, the smart charger 114 prohibits any charging of the energy storage unit 122 between the hours 10 until 2:00 AM and 3:00 AM to 5:00 AM because the offset price values 208 do not adjust the initial set point price 206 enough in order to charge the energy storage unit 122 at a rate which is desired by the electric vehicle user. However, the smart charger 114 initiates charging of the energy storage unit 122 between the hours of 2 to 3:00 AM and 5 to 6:00 AM since the offset prices 208 make the initial price set point 206 greater than the price level 315 that is provided within those windows.

The smart charger 114 during the first window of 2:00 AM to 3:00 AM increases the charge rate from the baseline rate by a factor of 1 kilowatt hour (from the prior offset value of 1 kWh to 2 kWh. Similarly, for the charge window between 5:00 AM and 6:00 AM, the smart charger 114 has a charge rate offset of plus 8 kilowatt hours which is significantly greater than the 2 kilowatt hours of the first window between 2:00 AM and 3:00 AM. In this way with the significant increase in charge offset 323 for the second window which is between 5 and 6:00 AM, the smart charger 114 may be able to download enough energy into the energy storage unit 122 such that it reaches the level desired by the user within a shorter time interval.

Figure 5:
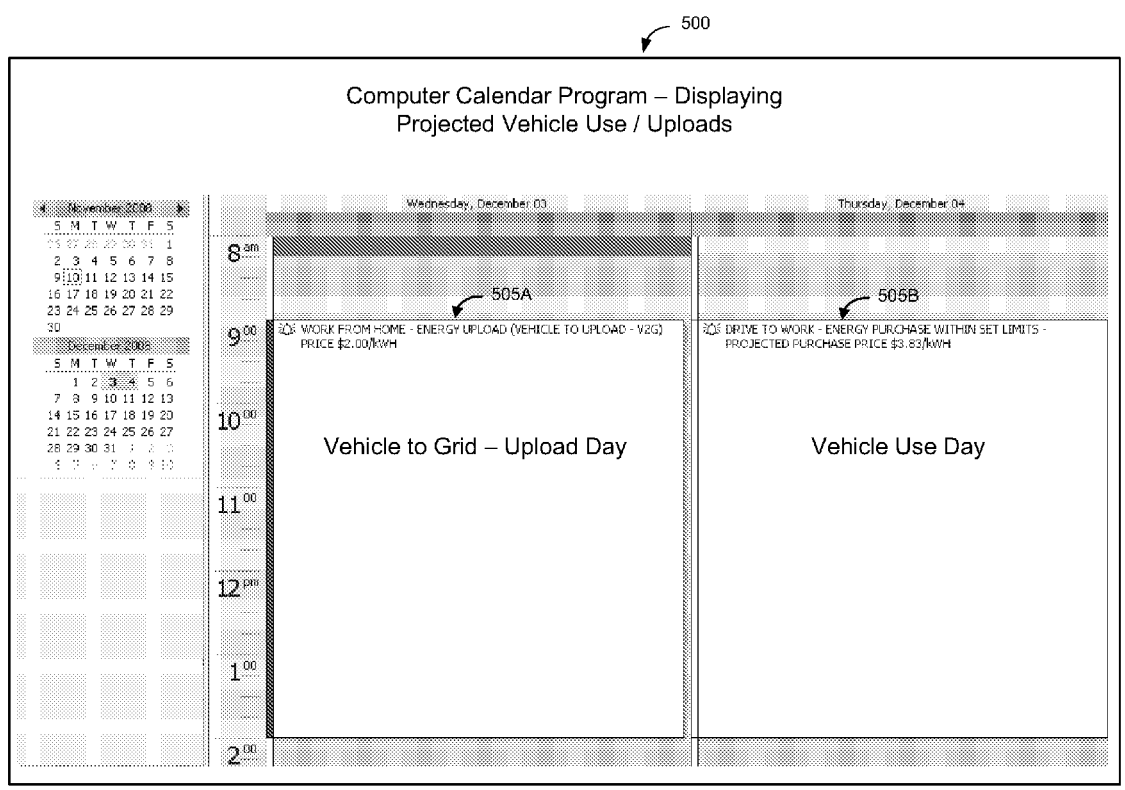
FIG. 5 illustrates a user interface for an electronic calendar which can be accessed and modified by a charging program according to one exemplary embodiment of the invention.

Referring now to FIG. 5, this figure illustrates a user interface for an electronic calendar 131 which can be accessed and modified by the charging program 120 according to one exemplary embodiment of the invention. The charging program 120 can store energy rates over long periods of time such as the order of years with respect to the signals that it receives from the regional transmission office 135 as illustrated in FIG. 1 discussed above.

Based upon this historical data of energy prices, the charging program 120 can project the price levels for a certain predetermined period of time such as the upcoming windows needed to charge the electric vehicle 101. In other words, the charging program 120 can project the price level 315 at which a power provider may charge per kilowatt hour. Similarly, the charging program can also monitor price levels 315 at which the RTO 135 may pay for energy uploads from the energy storage device 122 that may be referred to in the industry as "vehicle-to-grid" ("V2G").

By assessing the price levels 315 for energy downloads and uploads, the charging program 120 can determine if it would be more economical for the electric vehicle owner to upload any excess energy in the energy storage unit 122 for sale to the grid instead of downloading energy from the grid at a significant cost. In other words, the charging program 120 can perform a cost benefit analysis to determine if the user of the electric vehicle 101 could make more money uploading energy from the energy storage unit 122 instead of downloading electrical energy to the energy storage unit 122.

If the charging program 120 determines that the user of the electric vehicle 101 would benefit more by uploading energy instead of downloading energy, then the charging program 120 can communicate with the personal computer 127 and send signals for the personal computer 127 to adjust the electronic calendar 131 so that for a particular day, the user is requested to keep his electric vehicle 101 at home for an energy upload such as the scheduled entry 505A as illustrated in FIG. 5. Similarly, after performing a cost benefit analysis and if the charging program 120 determines that the electric vehicle user would benefit more by downloading energy to the energy storage 122, then the charging program 120 can send signals to the electronic calendar 131 to create a vehicle use day 505B. In this way, schedule use of the electric vehicle 101 can automatically be determined and provided to the user.

Figure 6A:
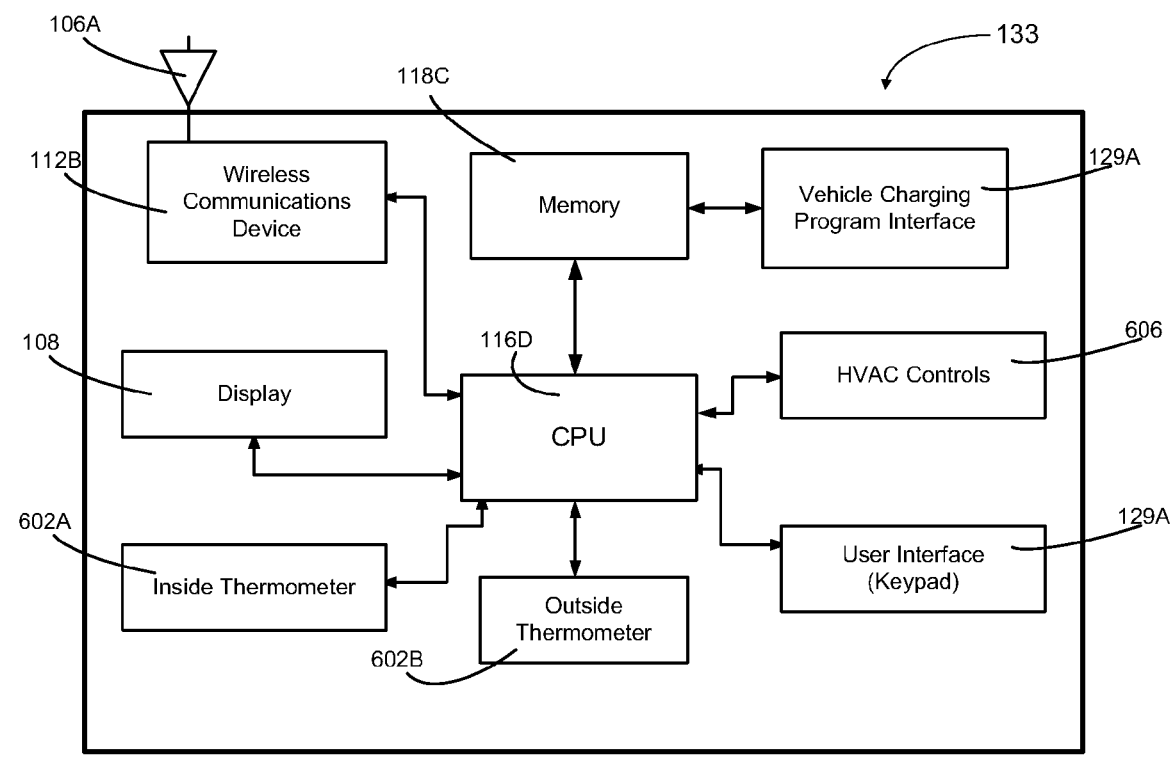
FIG. 6A is a functional block diagram illustrating some exemplary details for the smart thermostat according to one exemplary embodiment of the invention.

Referring now to FIG. 6A, this figure is a functional block diagram illustrating some exemplary details for the smart thermostat 133 according to one exemplary embodiment of the invention. Many elements of the smart thermostat 133 are similar to those found in the electric vehicle 101 and the charging unit 125. Therefore, only those elements which are not common between FIG. 1 and FIG. 6A will be discussed and described below.

Figure 6B:
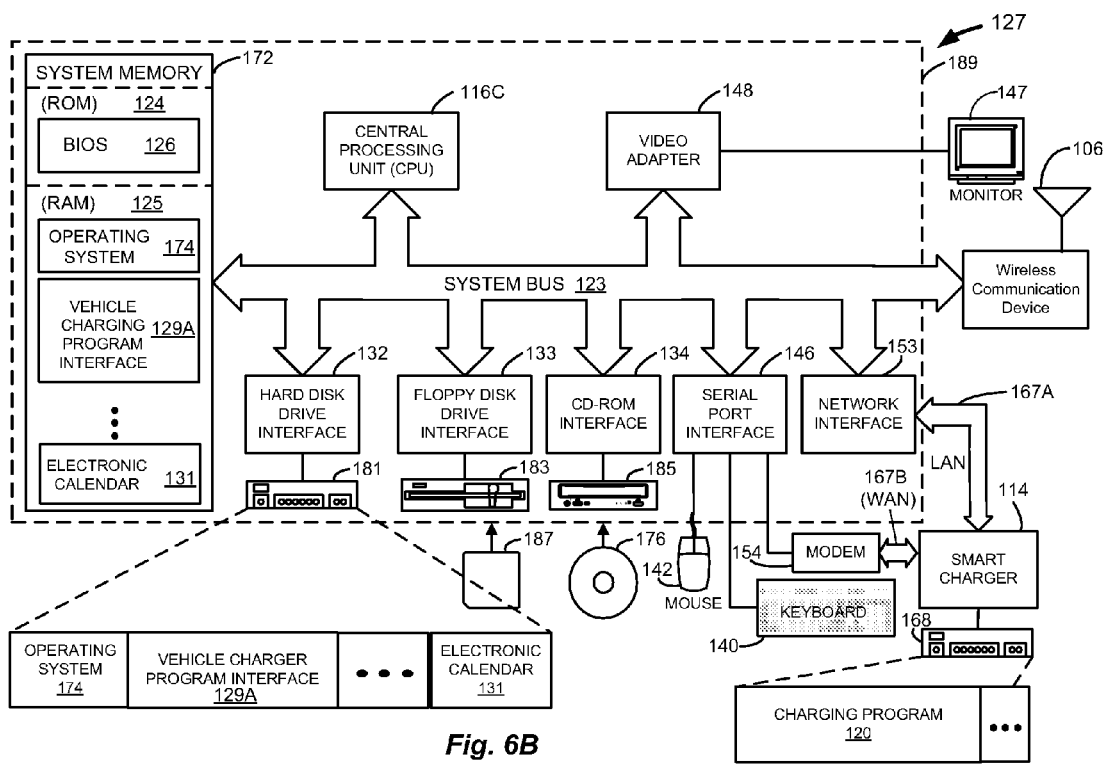
FIG. 6B is a functional block diagram of a computer that can be used in the charging system according to one exemplary embodiment of the invention.

The central processing unit (CPU) 116D of the smart thermostat 133 can be coupled to a thermostat 602A which is designed to track internal or inside temperature relative to a dwelling. Similarly, the CPU 116D can be coupled to a second thermostat 602B which is designed to monitor the outside temperature or temperature external to a dwelling. The CPU 116D can also be coupled to a user interface 608 such a keypad. And lastly, the CPU 116D can be coupled to heating, ventilation, and air conditioning (HVAC) control 606 for controlling various environmental equipment for a dwelling such as furnaces, heat pumps and air conditioning units. As noted in FIG. 1 the CPU 116D can run or execute a vehicle charging program interface 129A which may be stored in memory 118C. As noted previously, instead of an interface 129A the CPU 116D could execute or run the actual charging program 120 as discussed above. Referring now to FIG. 6B, this figure is a functional block diagram of a computer 127 that can be used in the charging system 101 according to one exemplary embodiment of the invention. The exemplary operating environment for the charging system 101 includes a general-purpose computing device in the form of a conventional computer 127E. Generally, the computer 127E includes a processing unit 116C, a system memory 172, and a system bus 123 that couples various system components including the system memory 172 to the processing unit 116C.

The system bus 123 may be any of several types of bus structures including a memory bus or memory controller, a peripheral bus, and a local bus using any of a variety of bus architectures. The system memory includes a read-only memory (ROM) 124 and a random access memory (RAM) 125. A basic input/output system (BIOS) 126, containing the basic routines that help to transfer information between elements within computer 120, such as during start-up, is stored in ROM 124.

Computer 100E further includes a hard disk drive 181 for reading from and writing to a hard disk, not shown, a magnetic disk drive 183 for reading from or writing to a removable magnetic disk 187, and an optical disk drive 195 for reading from or writing to a removable optical disk 187 such as a CD-ROM or other optical media. Hard disk drive 181, magnetic disk drive 183, and optical disk drive 185 are connected to system bus 123 by a hard disk drive interface 132, a magnetic disk drive interface 133, and an optical disk drive interface 134, respectively.

Although the exemplary environment described herein employs hard disk 181, removable magnetic disk 187, and removable optical disk 176, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for computer 127.

A number of program modules may be stored on hard disk 181, magnetic disk 187, optical disk 176, ROM 124, or RAM 125, including an operating system 174 and the vehicle charging interface 129A. Program modules include routines, subroutines, programs, objects, components, data structures, etc., which perform particular tasks or implement particular abstract data types. Aspects of the present invention may be implemented in the form of the vehicle charging interface 129A communicating with a the smart charger 114 and the vehicle charging program 120A or 120B.

A user may enter commands and information into computer 127 through input devices, such as a keyboard 140 and a pointing device 142. Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 116C through a serial port interface 146 that is coupled to the system bus 123, but may be connected by other interfaces, such as a parallel port, game port, a universal serial bus (USB), or the like. A display device 147 may also be connected to system bus 123 via an interface, such as a video adapter 148. In addition to the monitor 147, computers typically include other peripheral output devices (not shown), such as speakers and printers.

The computer 127 may operate in a networked environment using logical connections to one or more remote computers, such as the smart charger 114. A remote computer may be another personal computer, a server, a client, a router, a network PC, a peer device, or other common network node. While a remote computer typically includes many or all of the elements described above relative to the computer 127, only a memory storage device 118A has been illustrated in the Figure. The logical connections depicted in the Figure include a local area network (LAN) 167A and a wide area network (WAN) 167B. Such networking environments are commonplace in offices, enterprise-wide computer networks, intranets, and the Internet.

When used in a LAN networking environment, the computer 127 is often connected to the local area network 167A through a network interface or adapter 153. When used in a WAN networking environment 167B, the computer 127 typically includes a modem 154 or other means for establishing communications over WAN 167B, such as the Internet. Modem 154, which may be internal or external, is connected to system bus 123 via serial port interface 146. In a networked environment, program modules depicted relative to computer 127, or portions thereof, may be stored in the remote memory storage device 118A. It will be appreciated that the network connections shown are exemplary and other means of establishing a communications link between the computers may be used.

Moreover, those skilled in the art will appreciate that the present invention may be implemented in other computer system configurations, including hand-held devices, multi-processor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 6C:
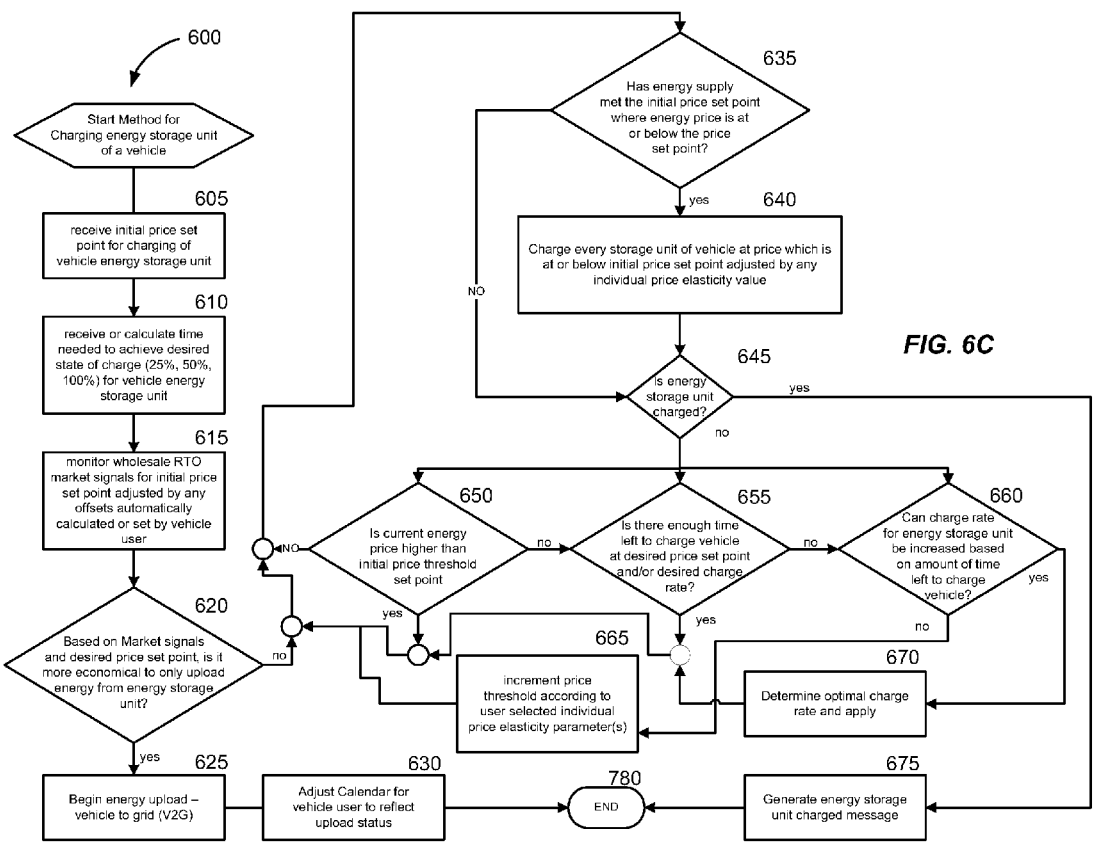
FIG. 6C is a logic flow diagram illustrating an exemplary method for charging an energy storage unit of an electric vehicle according to one exemplary embodiment of the invention

Referring now to FIG. 6C, this figure is a logic flow diagram illustrating an exemplary method 600 for charging an energy storage unit 122 of a vehicle 101 according to one exemplary embodiment of the invention. Logic flow diagram 600 highlights some key functional features of the charging program 120 as illustrated in FIG. 1. As noted above, one of ordinary skill in the art will appreciate that the process functions of the computer program 120 may be executed by firmware in combination with a microcontroller, a microprocessor, a digital signal processor, or a state machine implemented in application specific integrated grid circuits (ASIC), programmable logic, or other numerous forms of hardware and or software without departing from the scope and spirit of the invention.

In other words, the steps illustrated in FIG. 6 and the logic flow diagrams of this disclosure may be provided as a computer program which may include a machine-readable medium having stored thereon instructions which may be used to program a computer (or other electronic device) to inform the process according to the invention. The machine-readable medium may include, but is not limited to, optical disks, CD-ROMs, magneto optical disks, ROMs, RAMs, EEPROMs, magneto optical cards, flash memory for other types of media/machine-readable mediums suitable for storing electronics instructions.

Certain steps in the processes or process flow described in all the logic flow diagrams of this disclosure must naturally precede others for the invention to function as described. However, the invention is not limited to the order of the steps described in such order or sequence does not alter the functionality of the present invention. That is, it is recognized that some steps may be performed before, after, or parallel to other steps without departing from the scope and spirit of the invention. Further, one of ordinary skill in programming would be able to write such a computer program or identify appropriate hardware or circuits to implement the disclosed invention without difficulty based on the flowcharts and associated description and the application text, for example.

Therefore, disclosure of a particular set of program code instructions or detailed hardware device is not considered necessary for an adequate understanding of how to make or use the invention. The inventive functionality of the claimed computer implemented process will be explained in more detail in the following description and in conjunction with the remaining figures illustrating other processes.

Step 605 is the first step in the method 600 for charging an energy storage unit 122 of an electric car 101. The computer program 120 can receive an initial price set point 206 that a user may wish to pay to purchase energy such as electricity for storing in an energy storage unit 122 of an electric vehicle 101. This initial price set point 206 can be entered by user through a user interface 201 generated by either a vehicle charging program interface 129A or a charging program 120 itself.

Referring now to Step 610, in this step, the computer program 120 can receive or calculate the time needed to achieve the desired state of charge for the vehicle energy storage unit 122. In the exemplary embodiment illustrated in FIG. 2, a user can enter time data 214 that corresponds to the time of day in which a user would like the vehicle energy storage unit 122 to have a certain state or level of charge. Alternatively, (not illustrated), a user could enter the amount of time that he would like to have the smart charger 114 to initiate a charge of the energy storage unit 122.

In Step 615, the charging program 120 can monitor the RTO market signals generated by the regional transmission office (RTO) 135 as illustrated in FIG. 1. The charging program 120 can monitor the wholesale RTO market signals for comparing them to the initial price set point 206 as adjusted by any price offset values 208 which may be automatically calculated or set by an electric vehicle user. As noted above, the spectrum of price offsets 208 illustrated in FIGS. 3 and 4 can be computed by the charging program 120 or they can be set according to a user who may have access to table 300 and table 400.

In decision Step 620, the charging program 120 can determine if it is more economical for an electric vehicle to only upload energy from the energy storage unit 122 based on the market signals and desired price set point 206 set by user. If the inquiry to decision Step 620 is negative, then the "no" branch is followed to decision Step 635. If the inquiry decision Step 620 is positive, then the "yes" branch is followed to Step 625. In Step 625, energy from the energy storage unit 122 may be uploaded to the grid. Next, in Step 630, the charging program 120 can adjust the calendar 131 for a vehicle user in order to reflect the current upload status for the energy storage unit of the electric vehicle 101.

In decision Step 635, the charging program 120 can determine if the energy supplies signals have met the initial price set point 206 where the energy price 315 is at or below the initial price set point 206. If the inquiry to decision Step 635 is positive, then the "yes" branch is followed to Step 640. If the inquiry to decision Step 635 is negative, then the "no" branch is followed to decision Step 645.

In Step 640, the charging program 120 can allow the smart charger 114 to start charging the energy storage unit 122 of the vehicle 101 at a price which is at or below the initial price set point 206 adjusted by any individual price elasticity value or price offset value as described above in connection with FIGS. 3-4.

If the inquiry to decision Step 635 is negative, then the "no" branch is followed to decision Step 645. In Step 645 If the inquiry to decision Step 645 is positive, then the "yes" branch is followed to Step 675. If the inquiry to decision Step 645 is negative, then the "no" branch is followed to a junction point 647 which is divided among three parallel decision Steps 650, 655, and 660. These three Steps 650, 655, and 66 can be performed in parallel with one another according to one exemplary embodiment of the invention.

In decision Step 650, the charging program 120 can determine if the current energy price 315 is higher than the initial price threshold/set point 206. If the inquiry to decision Step 650 is negative, then the "no" branch is followed to decision Step 655. If the inquiry to decision Step 650 is positive, then the "yes" branch is followed back to decision step 635.

In decision Step 655, the charging program 120 can determine if there is enough time left to charge the electric vehicle 101 at the desired price set point and/or at the desired charge rate. The charging program 120 can compute this amount of time based on the desired time for completing the charge in addition to the initial time that the electric vehicle 101 is coupled to the electric grid. If the inquiry to decision Step 655 is positive, then the "yes" branch is followed back to decision Step 635. If the inquiry to decision Step 65 is negative, then the "no" branch is followed to decision Step 660.

In decision Step 660, the charging program 120 can determine if the vehicle charge for the energy storage unit 122 be increased based on the amount of time left to charge the vehicle 101? If the inquiry to decision Step 660 is positive, then the "yes" branch is followed to Step 670. If the inquiry to decision Step 660 is negative, then the "no" branch followed and the price threshold is incremented to the next price threshold or offset value 206 according to users selected individual price elasticity primers or also know as price set points. Step 665 corresponds to the price offset values 208 and FIGS. 3 and 4. In Step 670, the charging program 120 can determine the optimal charge rate for the smart charger 114 and instruct the smart charger 114 to charge at this optimal charge rate.

If the inquiry to decision Step 645 if positive, then the "yes" branch is followed to Step 675. In Step 675, the charging program 120 can generate a storage unit charged message and display it to the user on the display 108 in the electric vehicle 101, or in a display of the smart thermostat 133, or in the display of a computer 127. The process then ends.

Alternative embodiments of the cooperative charging or powering system 200 will become apparent to one of ordinary skill in the art to which the invention pertains without departing from its spirit and scope. Thus, although this invention has been described in exemplary form with a certain degree of particularity, it should be understood that the present disclosure is made only by way of example and that numerous changes in the details of construction and the combination and arrangement of parts or steps may be resorted to without departing from the scope or spirit of the invention. Accordingly, the scope of the present invention may be defined by the appended claims rather than the foregoing description.

What is claimed is:

1. A system for charging an electric vehicle, comprising:
   an apparatus for receiving input comprising one or more vehicle charging parameters, the apparatus comprising a first wireless communication device for transmitting the vehicle charging parameters in a wireless manner, at least one vehicle charging parameter comprising a price offset that is associated with charging the electric vehicle, the price offset defining a cost threshold that is applied against a current price level for electricity and which is used by a smart charger to initiate charging of the electric vehicle, the price offset prohibiting any charge of the electric vehicle if the current price level for electricity is not within a range defined by an initial price set point and the price offset, the apparatus supporting a user interface for allowing adjustment of the price offset; and
   an electric vehicle comprising a second wireless communication device and the smart charger for receiving the vehicle charging parameters and using the vehicle charging parameters for controlling electricity which is fed into an energy storage unit.

2. The system of claim 1, wherein the apparatus comprises a personal computer.

3. The system of claim 2, wherein personal computer has an electronic calendar which receives scheduling signals from the smart charger.

4. The system of claim 3, wherein the smart charger executes a charging program that monitors energy price levels from one or more regional transmission offices.

5. The system of claim 4, wherein the electric vehicle comprises a plug-in hybrid electric vehicle (PHEV).

6. The system of claim 5, wherein the vehicle charging parameters further comprise one of a price point in which charging of the electric vehicle can be started, a time needed to achieve a certain level of charge for the energy storage unit, and a current price level indicating a current price of electricity.

7. The system of claim 1, wherein the apparatus comprises a smart thermostat.

8. The system of claim 1, wherein the smart charger executes a charging program that monitors energy price levels from one or more regional transmission offices.

9. The system of claim 1, wherein the electric vehicle comprises a plug-in hybrid electric vehicle (PHEV).

10. The system of claim 1, wherein the vehicle charging parameters comprise one of a price point in which charging of the electric vehicle can be started, a time needed to achieve a certain level of charge for the energy storage unit, and a market signal indicating a current price of the signal.

11. The system of claim 1, wherein the vehicle charging parameters further comprise a charge rate offset that may increase a charging rate for the smart charger.

12. A computer implemented method for recharging an electric vehicle comprising:
   receiving by a processor one or more price offsets;
   receiving by the processor an initial price set point for starting an electric charge for the electric vehicle;
   calculating by the processor an amount of time needed to achieve a predetermined desired state of charge;
   monitoring market signals with the processor for energy prices which are at or below the initial price set point;

if an energy price falls below the initial price set point, initiating with the processor charging of the energy storage unit of the electric vehicle;

if an energy price is above the initial price set point, then applying a price offset to the initial price set point with the processor, each price offset being associated with charging the electric vehicle, each price offset defining a cost threshold that is applied against a current price level for electricity and which may be used by a smart charger to initiate charging of the electric vehicle, the price offset prohibiting any charge of the electric vehicle if the current price level for electricity is not within a range defined by the initial price set point and the price offset; and receiving by the processor one or more adjustments to at least one of the price offsets.

13. The method of claim 12, wherein the one or more price offsets are received with a processor of one of a computer and a thermostat.

14. The method of claim 12, further comprising determining with a processor if enough time exists to charge the electric vehicle.

15. The method of claim 12, further comprising determining with a processor if uploading energy from the energy storage unit is advantageous to an operator of the electric vehicle.

16. The method of claim 15, further comprising accessing an electronic calendar with a processor and scheduling use of the electric vehicle.

17. The method of claim 12, wherein monitoring market signals with the processor for energy prices which are at or below the initial price set point is performed by a processor of a smart charger.

18. The method of claim 17, wherein the electric vehicle comprises a plug-in hybrid electric vehicle (PHEV).

19. The method of claim 18, further comprising receiving with a processor one of a price point in which charging of the electric vehicle can be started, and a time needed to achieve a certain level of charge for the energy storage unit.

20. The method of claim 19, further comprising receiving with a processor a charge rate offset that may increase a charging rate for the smart charger.

* * * * *